United States Patent
Ross

(10) Patent No.: US 10,791,720 B2
(45) Date of Patent: Oct. 6, 2020

(54) CORAL NURSERY BASED ON OVERGROWTH OF A TENSIONED LINE

(71) Applicant: Andrew MacKay Ross, Freeport (JM)

(72) Inventor: Andrew MacKay Ross, Freeport (JM)

( * ) Notice: Subject to any disclaimer, the term of this patent is extended or adjusted under 35 U.S.C. 154(b) by 643 days.

(21) Appl. No.: 15/405,280

(22) Filed: Jan. 12, 2017

(65) Prior Publication Data
US 2017/0196206 A1      Jul. 13, 2017

Related U.S. Application Data

(60) Provisional application No. 62/277,949, filed on Jan. 12, 2016.

(51) Int. Cl.
*A01K 61/75*   (2017.01)
*A01K 61/70*   (2017.01)
*A01K 61/30*   (2017.01)

(52) U.S. Cl.
CPC .............. *A01K 61/75* (2017.01); *A01K 61/30* (2017.01); *A01K 61/70* (2017.01); *Y02A 40/83* (2018.01); *Y02A 40/836* (2018.01)

(58) Field of Classification Search
CPC ........ A01K 61/60; A01K 61/70; A01K 61/72; A01K 61/73; A01K 61/75; A01K 69/06; A01K 71/00; A01K 73/00; A01K 91/00; A01K 91/14
USPC ....... 119/200, 221, 201, 204, 207, 208, 222; 43/44.87, 44.96, 44.98, 44.99, 102, 103
See application file for complete search history.

(56) References Cited

U.S. PATENT DOCUMENTS

| | | | | | |
|---|---|---|---|---|---|
| 4,351,268 | A | * | 9/1982 | Blair | A01K 61/60 119/223 |
| 4,744,331 | A | * | 5/1988 | Whiffin | A01K 29/00 119/223 |
| 5,412,903 | A | * | 5/1995 | Zemach | A01K 61/60 43/102 |
| 5,443,682 | A | * | 8/1995 | Edmonds | B65B 15/00 156/552 |
| 5,526,763 | A | * | 6/1996 | Liaw | B63B 35/34 114/264 |

(Continued)

*Primary Examiner* — David J Parsley
*Assistant Examiner* — Danielle A Clerkley
(74) *Attorney, Agent, or Firm* — Marin Patents LP; Gustavo Marin

(57) ABSTRACT

A rapidly deployable underwater coral cultivation system comprising a tensioned propagule support line or rod, and a propagule-encircling loop for attachment thereto, wherein the propagules' tissues and skeleton overgrow the line/rod. Multiple propagules of a single genetic clone on a line/rod may fuse into a single linear coral colony, whereby the natural structural and anti-fouling attributes of the target organism provide structural rigidity to the system and high survivorship of the live material in nursery culture. A preferred embodiment may provide a low to no maintenance protocol soon after deployment thereby allowing for "set and forget" through self-planting endpoints. In some embodiments, a vertical arrangement provides full leverage advantage to the support buoy as growth increases (coral) weight. In some embodiments, the vertically-oriented single genetic clone facilitates gamete capture for facilitated spawning in coral (ecosystem) enhancement and restoration.

4 Claims, 6 Drawing Sheets

(56) References Cited

U.S. PATENT DOCUMENTS

| | | | | |
|---|---|---|---|---|
| 5,669,330 | A * | 9/1997 | O'Hare | A01K 61/70 119/215 |
| 6,044,798 | A * | 4/2000 | Foster | A01K 61/54 119/240 |
| 6,712,024 | B1 * | 3/2004 | Hall | A01K 61/70 119/222 |
| 7,512,326 | B1 * | 3/2009 | Eldredge | G03B 17/08 396/25 |
| 2002/0069831 | A1 * | 6/2002 | Clark | A01K 61/17 119/215 |
| 2003/0111020 | A1 * | 6/2003 | Targotay | A01K 61/00 119/200 |
| 2007/0193115 | A1 * | 8/2007 | Buck | A01G 33/00 47/65.5 |
| 2008/0029040 | A1 * | 2/2008 | Quinta Cortinas | A01K 61/54 119/208 |
| 2014/0020283 | A1 * | 1/2014 | Troedsson | A01K 61/00 44/307 |
| 2014/0321913 | A1 * | 10/2014 | Goei | B29B 17/00 405/21 |
| 2016/0286767 | A1 * | 10/2016 | Newell | A01G 31/02 |

\* cited by examiner

CORAL NURSERY BASED ON OVERGROWTH OF A TENSIONED LINE

CROSS-REFERENCE TO RELATED APPLICATIONS

This application claims the benefit of, and priority to U.S. provisional application 62/277,949 titled, "CORAL NURSERY BASED ON OVERGROWTH OF A TENSIONED LINE" filed on Jan. 12, 2016, the entire specification of which is incorporated herein by reference.

BACKGROUND OF THE INVENTION

Field of the Art

The disclosure relates to the field of coral reef cultivation techniques, in particularly to a coral nursery apparatus and its application.

Discussion of the State of the Art

Caribbean mean coral coverage has declined from some 50% to less than 15% since the mid-1970s due to disease and other issues related to human disturbance including overfishing. These (coral) losses have been primarily within the two ecosystem foundation species of the genus *Acropora*.

Losses and impacts to ecosystem services related to these coral losses have included reductions in ecosystem and fishery productivity, beach and coastal erosion and infrastructure damage requiring costly engineering and losses in coastal and submarine aesthetics including tourism draw. Furthermore, upward-growing (coral) reef is vital to mitigating the impacts of sea-level rise related to global climate change. Strong, reproductively functional populations of coral and other reef fauna and flora are vital to long-term adaptability to changing sea conditions of temperature, pH, currents etc. related to increasing atmospheric $CO_2$.

Many sessile benthic marine organisms including hard and soft corals, sponges and the like employ vegetative asexual fragmentation in colony expansion. In this, such organisms readily fracture and reattach to new seafloor or to other structure including other neighboring elements of same said organism. This natural history may be employed in active nursery culture including ongoing re-fragmentation, propagation and replanting for enhancement and restoration under horticultural and forestry themes.

Culture and Restoration:

Fragmentary life-history of Acroporid and other high-value corals make them well suited to nursery culture, suggesting active approaches to mitigating and enhancing against their aforementioned current and pending issues. As such, many active coral nursery, "gardening" and similar propagative enhancement and restoration processes have been proposed and trialed over recent decades spanning from elevating concrete and ceramic plinths to tables and mid-water frameworks through various suspended line and mesh systems.

A primary cost in the in situ (undersea) culture of marine benthic fauna (particularly coral) is that of set-up. Much of the structural work may be prefabricated on land; however, anchoring, deploying and setting of the living propagule fragment to the nursery structure is usually done underwater by divers breathing compressed air (SCUBA) including the requisite training, materials, equipment and logistics. Much of this high-cost underwater time is devoted to the tying of knots, twisting of ropes or setting of cable-ties and wire attachments. In out-planting of the grown coral material, investments must be repeated in removing from the nursery, transportation including equipment and logistics and then securing the nursery derived coral back to the seafloor via various combinations of drilled holes, cements and adhesives, nails, ties and wires.

A further cost in time, resources and mortalities throughout this process are the fouling non-target organisms which settle from the water column to inhabit the nursery structure. Current in situ nursery culture relies on either abundances of cleaning fish within fish sanctuaries and marine parks or upon human cleaner-divers either employed or voluntary. The necessity of such cleaning may be minimized by the minimization of biofouling settlement locations within the nursery structure, which has been partially achieved in suspended sample systems such as the "Tree" nursery employed by the Coral Restoration Foundation, The Nature Conservancy and University of Miami and the buoyant mid-water line systems employed by Seascape Caribbean and the University of Puerto Rico.

Beyond human and ecological cleaning, minimization of structure and trials with antifouling treatments in the Red Sea and elsewhere, no particular advancements in fouling control have been made. However, such fouling organisms are (usually) unable to settle or colonize living tissue of an existing organism including the culture-target organism within a nursery. Thus, minimizing structural elements to the nursery device and setting propagules of like-lineage or genetic background (including cleaved fusion and chimera development) in close proximity allows for comprehensive overgrowth of all nursery structure to eliminate loci for fouling organism settlement/establishment. This antifouling via overgrowth is a basis of a preferred embodiment of the instant invention.

Coral material for nursery culture is often rare on the wild reef, thus of high-value necessitating high-survivorship.

In current systems known in the art for coral reef cultivation, nursery setup is high-cost in programmatic development, funding, permitting and logistics whereby, in situ (in the sea), coral nurseries are time-consuming in deployment including setting of corals to the nursery. In ex situ (outside of the sea) coral nurseries tend to be costly in set-up and (ephemeral) electricity and are therefore somewhat unsuited to large-scale culture away from first-world infrastructure.

In current systems known in the art for coral reef cultivation, in situ coral nurseries tend to provide good settlement substrate for fouling/biofouling, requiring:

use of larger starter-fragments extending beyond the fouling organisms, acceptance of reduced productivities and acceptance of losses, deployment only into fish-abundant (protected) areas and/or clean water conditions, periodic physical cleaning, tending etc. at cost.

In current systems known in the art for coral reef cultivation, buoyant line nurseries are subject to entanglement of flotsam and intra-nursery during inclement seas leading to line-abrasion and breakages requiring repair.

In current systems known in the art for coral reef cultivation, more rigid designs (tables) suffer losses including total losses versus flexible systems.

In current systems known in the art for coral reef cultivation, most in situ coral nursery designs are not moveable for pending storm nor bleaching.

In current systems known in the art for coral reef cultivation, out-planting of nursery grown material is laborious, usually requiring SCUBA.

In current systems known in the art for coral reef cultivation, larger corals usually fare better on the wild reef, though many coral nursery systems are limited in the size of corals that may be produced.

What is needed is a process-simplified system for the culture of coral employing the natural structural and antifouling attributes of the organism.

SUMMARY OF THE INVENTION

Accordingly, the inventor has conceived and reduced to practice, in a preferred embodiment of the invention, a tensioned-line coral nursery device and method for the propagative culture of sessile benthic marine organisms.

According to a preferred embodiment of the invention, a tensioned-line coral nursery is a device and method for the propagative culture of sessile benthic marine organisms (for example, stony corals) employing a single tensioned-line as preliminary structure, or, in some embodiments, an array of such single lines or, in some embodiments, a fine rigid rod or array of rods. According to a preferred embodiment, the nursery's target organism may overgrow the line/rod, providing further rigidity, stability and structure to the line-based system while effectively eliminating troublesome biofouling on the system.

In a preferred embodiment, a softly tensioned version of this system, such as the vertical tensioned-line coral nursery as illustrated in FIGS. 1, 3 and 4, greatly accelerates deployment by eliminating tying of time consuming self-stabilized knots as the aforementioned tension allows a simple twisting loop to secure the living sample or propagule into the nursery line. According to the embodiment, once set and established, these systems are nearly without maintenance and may be left untended for long periods which is an improvement over systems known in the art. In some embodiments, they may even be forgotten entirely under self-planting protocols that employ designed-for failures of the support system, for example, utilizing a biodegrading mid-water float.

Further according to the embodiment, by using simplified and streamlined materials and set-up, rapid live propagule attachment, high-survivorship and high-growth with minimal maintenance followed by self-planting suggests particular cost savings with such systems therein allowing particular increases in programmatic scale.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventor has conceived, and reduced to practice, coral nursery based on overgrowth of a tensioned line or rod. Through FIG. 2 and following, the line may be exchanged for permanent or temporary rigid rod, according to embodiments of the invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural or other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Figure 1:
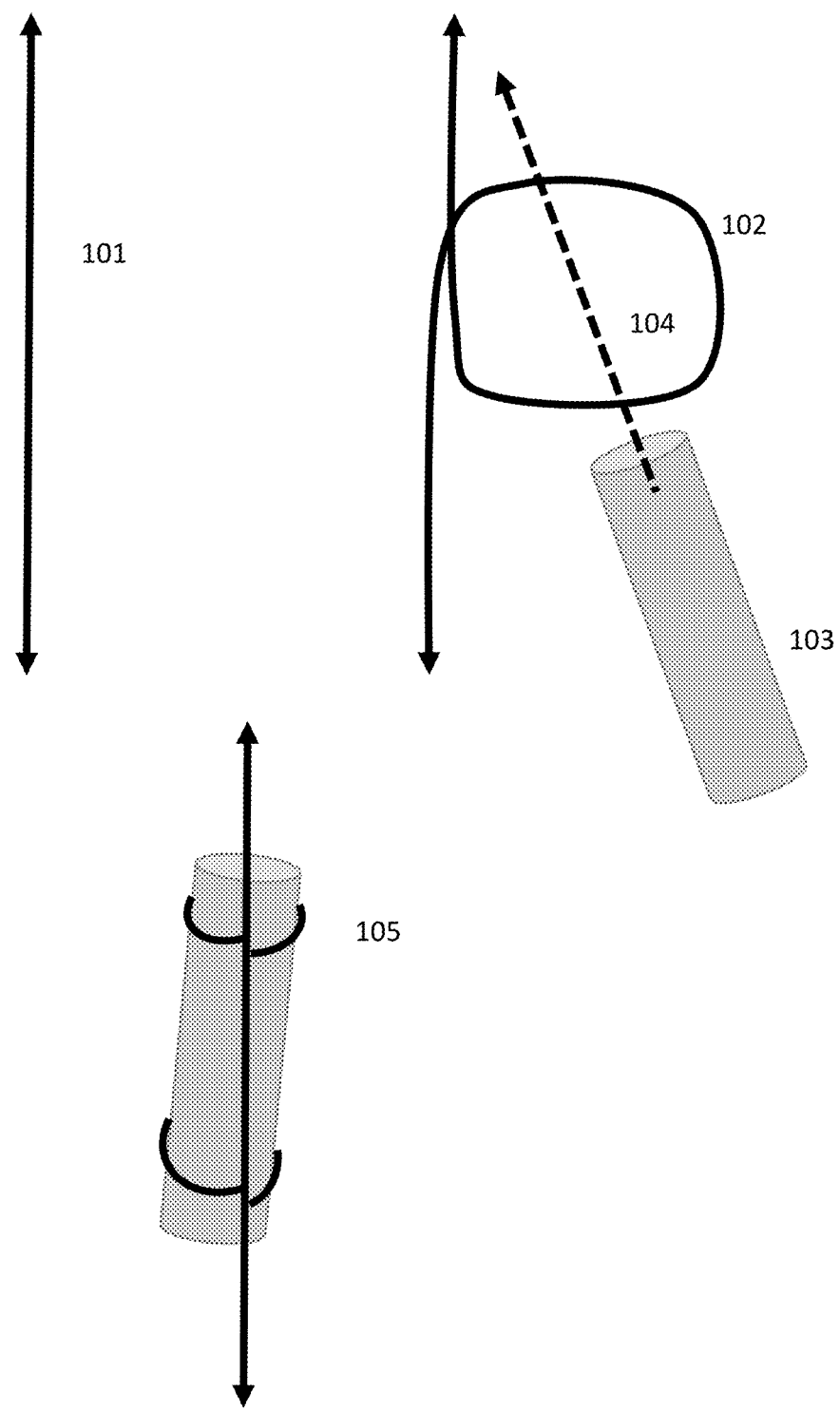
FIG. 1 is an illustration of an exemplary embodiment of a fragment-to-line attachment under light or adjustable tension using a loop rotated beyond 90 degrees and released to a tension around a target propagule, according to an embodiment of the invention.

FIG. 1 illustrates an exemplary embodiment of a fragment-to-line attachment under light or adjustable tension using a loop rotated beyond 90 degrees and released to a tension around a target propagule, according to an embodiment of the invention. According to the embodiment, line 101 under soft tension is given a loop 102 large enough to accommodate a living nursery propagule 103 (hereinafter also referred to as fragment) rotated beyond 90 degrees through which the living fragment 103 is passed through loop opening 104. When released, loop 102 tightens with a continuous tension around and securing fragment 103. This may then be repeated to set a plurality of loops at one end of fragment 103 and a plurality of loops at the other end of fragment 103, keeping the propagule tightly inline and adjacent, if not in contact with, support line 105. The propagule then overgrows the plurality of loops and adjacent or tissue-contacting line.

Figure 2:
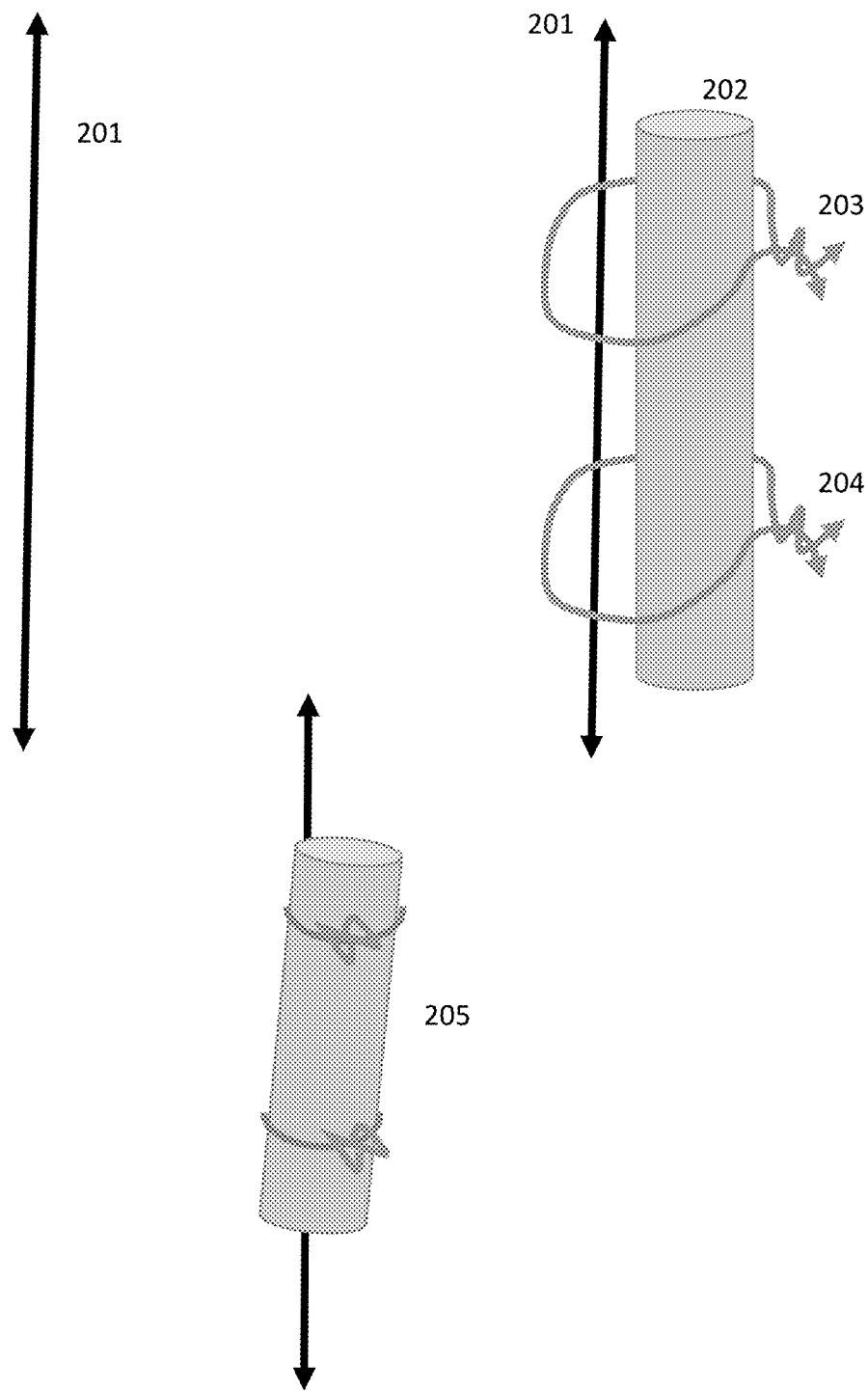
FIG. 2 is an illustration of an exemplary embodiment of a fragment attachment to a line under a set tension or to a rigid rod using secondary attachments, according to embodiments of the invention.

FIG. 2 is an illustration of an exemplary embodiment of a fragment-to-line attachment under a set tension and/or predetermined length using secondary attachments. According to the embodiment, living fragment 202 is set adjacent to the tensioned line 201 and secured into position with independent ties 203 and 204 (for example, line, cable-tie, wire, clip, adhesive, etc.) at a plurality of points in order to secure its orientation and connection with nursery line 201. The propagule then overgrows ties 203 and 204 and line 201 as described in FIG. 1.

In another embodiment, stiffer line 201 may be a rod (for example, wire or rigid fiberglass, stainless steel, and the like) and may be employed with this attachment method so long as the structure is able to be overgrown by the living tissues of the target organism within a reasonable period of time (i.e. before the support rod is unduly covered with biofouling including requiring cleaning). Said rod may also be temporary, intended to decompose over time to leave the rigid, conjoined coral independent. Such a rod may be of biodegradable plastic, wood or similar. Use of a rigid rod may allow for above-water attachment of corals, which may increase efficiency in some applications. A removable rod may also be similarly employed.

Figure 3:
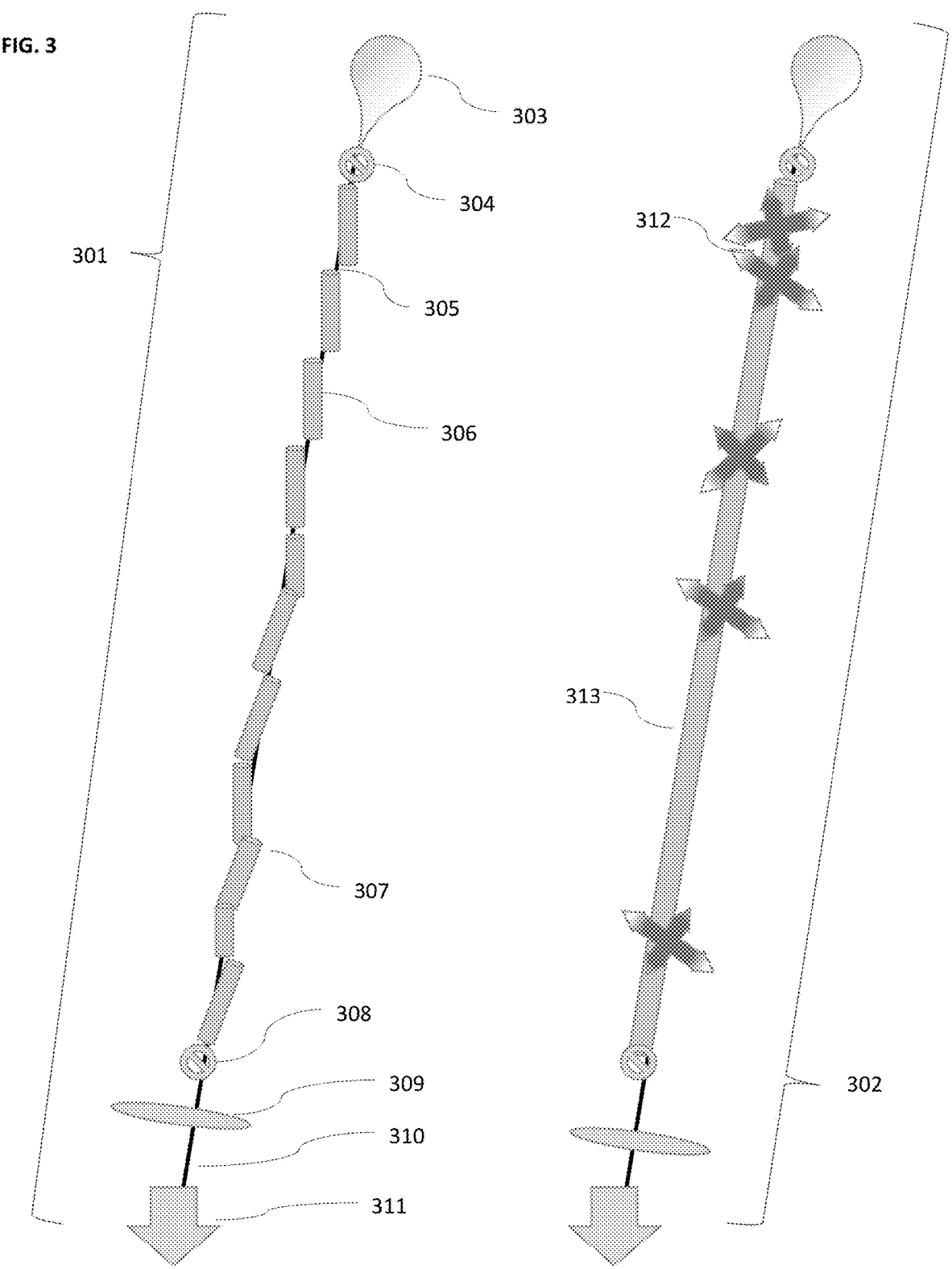
FIG. 3 is an illustration of an exemplary tension system illustrating propagule deployment, fusion and overgrowth of a structural line/rod according to an embodiment of the invention.

FIG. 3 is an illustration of an exemplary soft-tension system illustrating propagule deployment, fusion and overgrowth of a structural line, according to an embodiment of the invention. According to the embodiment, a "soft tension" system in a vertical tensioned-line arrangement is illustrated, wherein the primary line 305 is secured to the substratum 311 and tension is provided to line 305 by a mid-water buoy 303. The adjacent and overlapping including a plurality of together-tied propagules 307 are illustrated within the primary line. In some embodiments, swivels 304 and 308 may be included to allow the system 301 to rotate in the current. In some embodiments the line may be replaced with a rod, with corals attached per FIG. 2 either above or below water. System 301 illustrates a newly-deployed system while system 302 illustrates an established system with a plurality of independent fragments 307 fused into a single long colonial organism or "supercolony" 313 with new organism branches 312 developing. In some embodiments, little or none of the primary line is visible nor available to fouling organisms within negative-influential reach of the target organism.

In some embodiments, a soft-tension system design may be set into an array of parallel nursery lines over a single or amalgamated anchoring structure such as a secured bar or large mooring. For example, in an array arrangement, a rigid spacer bar may be set towards the top to keep the lines spaced. If buoyant, this bar may provide the floatation. In this regard, an inverted version of the instant embodiment is discussed in FIG. 6.

Figure 4:
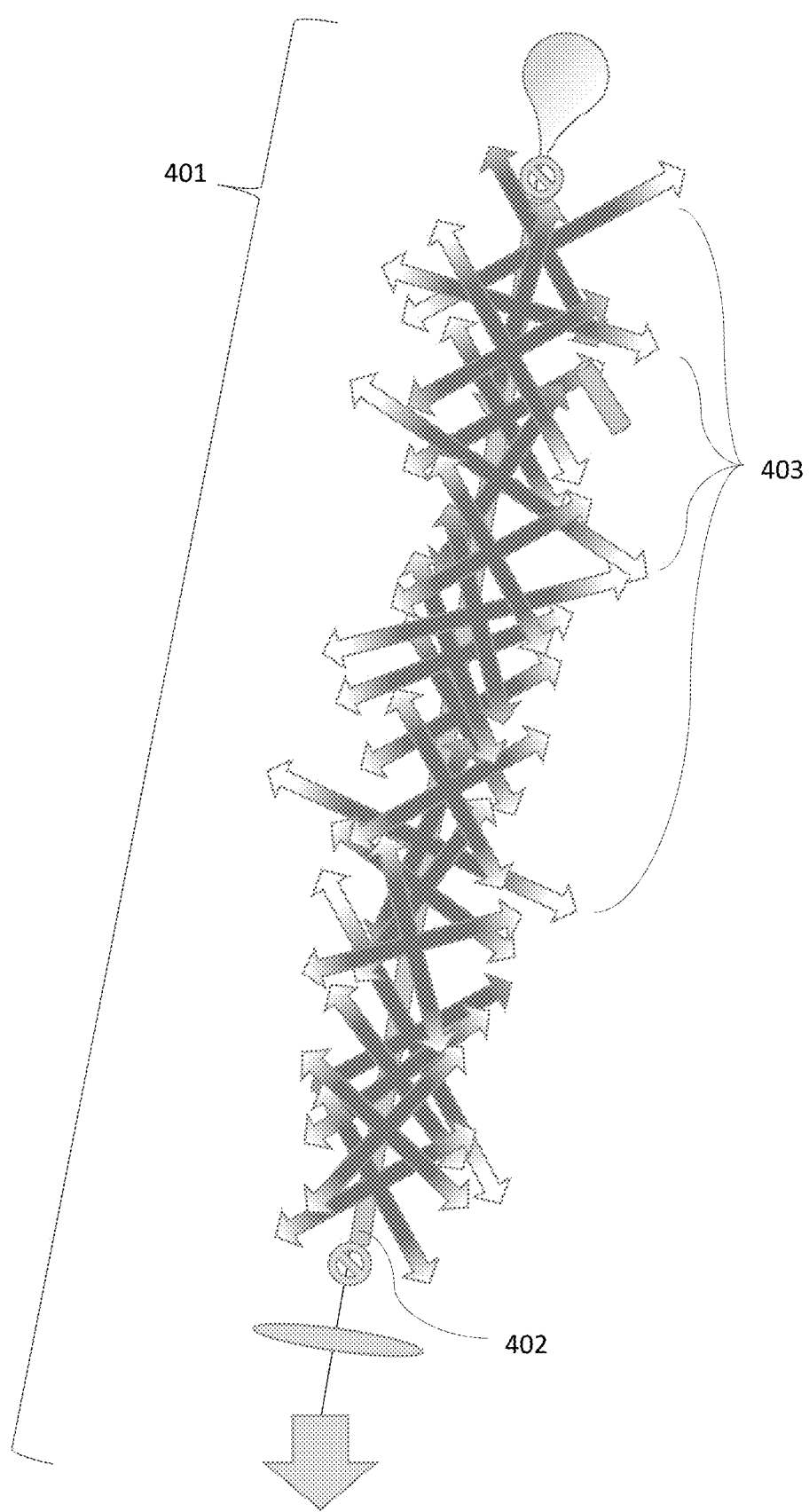
FIG. 4 is an illustration of an exemplary tension system at maturity illustrating a single rigid unit and abundant lateral branching, according to an embodiment of the invention.

FIG. 4 is an illustration of an exemplary soft-tension system at maturity illustrating a single rigid unit and abundant lateral branching, according to an embodiment of the invention. According to the embodiment, a mature system of several months 401 illustrates the structural line 402 but may not visible nor of structural relevance. The nursery-grown material 403 is abundant and may be harvested for further propagative work, out-planted in enhancement or renewal, used in experimentation, left in place as a sexually reproductive point of broadcast spawning or forgotten entirely under self-planting protocols.

Figure 5:
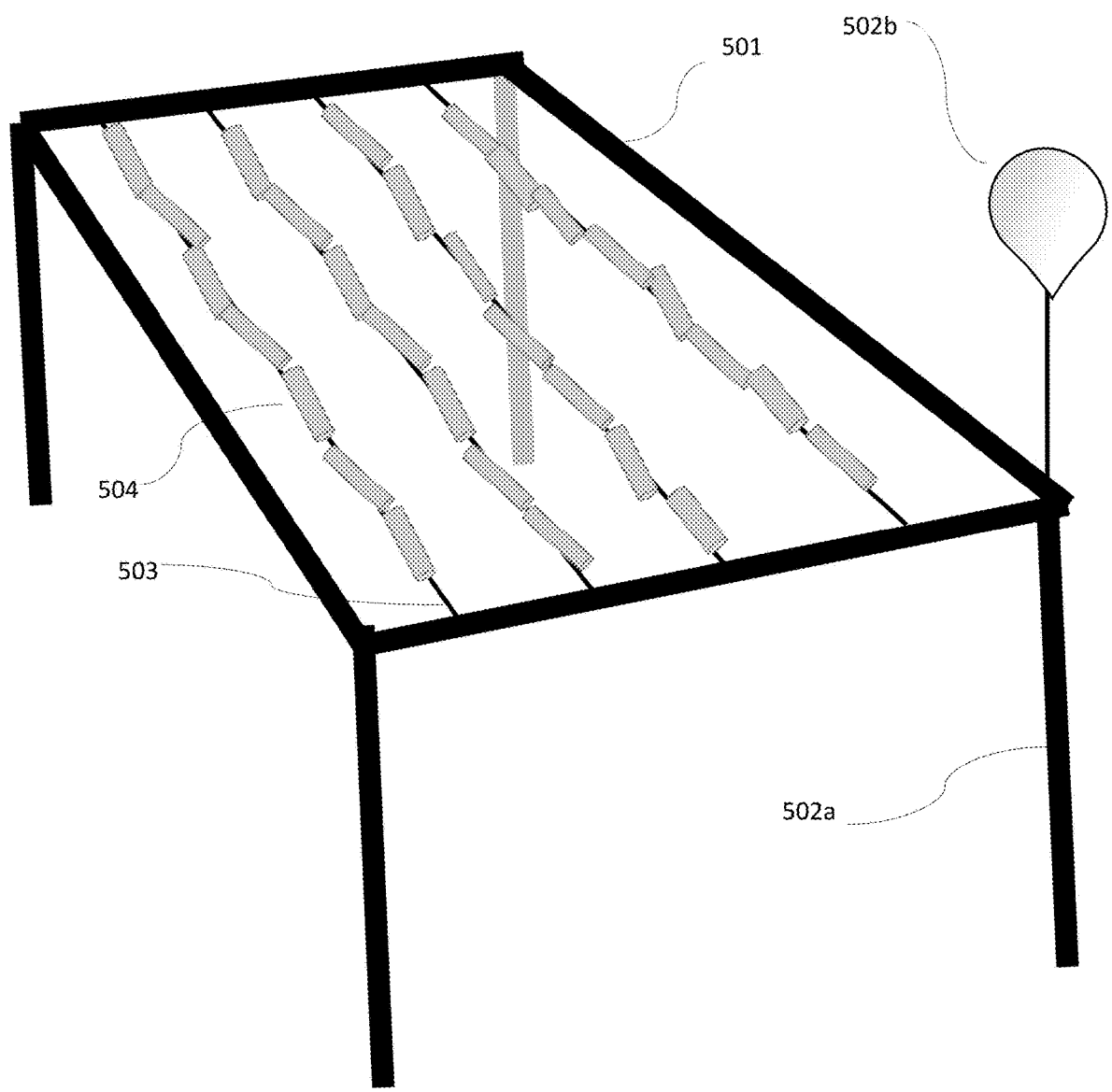
FIG. 5 is an illustration of an exemplary tight-tensioned line or rigid rod system as set into a rigid frame illustrating both legged and buoyant frame elevators, according to an embodiment of the invention.

FIG. 5 is an illustration of an exemplary tight-tension system as set into a rigid frame illustrating leg and buoyant frame elevators, according to an embodiment of the invention. According to the embodiment, a plurality of tight parallel lines 503 may be fastened to rigid frame 501. That is, empty (without living material) lines 503 are strung within the frame 501 and made permanently tight. A plurality of propagule segments 504 of the target organism may then be set to one or more 503 (for example, as described in FIG. 2), adjacent or overlapping end-to-end (for example, as described in FIG. 3). Swivels and predator dams may be employed as necessary. In some embodiments, samples in such a system will tend to be set to a plurality of lines as described in FIG. 2.

In some embodiments, benthic legged 502a and buoyant 502b support options for primary frame 501 may be provided as illustrated.

In some embodiments, frame 501 and/or support legs 502a may be made of any rigid material in order to remain rigid throughout the duration of the program. For example, galvanized steel pipe, welded or clamped rebar (steel), PVC pipe and the like. In this regard, a floating frame of sealed pipe or similar may reduce the necessity for buoying.

In some embodiments, frame 501 may be of any size provided that it remains appropriately rigid throughout.

In a preferred embodiment, one or more lines 503 may be of a non-stretching material such as braided or fluorocarbon (fishing) line, stainless steel wire or cable, carbon fiber or similar. In some embodiments, a rigid permanent or temporary rod structure such as of stainless steel, fiberglass or wood may also be employed in place of one or more lines 503.

In some embodiments, the one or more 503 may be attached to the frame with, for example, a knot around the frame structure or through a pre-set frame-attached loop or clip to such a loop or, for example, via a tightening device such as a turnbuckle, thread-nut assembly or similar.

In a preferred embodiment, frame 501 may be arranged horizontally providing a more uniform light exposure throughout the nursery. However, in another embodiment, frame 501 may be supported in any orientation.

In some embodiments, frame 501 may provide a secondary holding and growth period for established single tensioned line nurseries of another type. For example, an established vertical buoyant system 302, 401 of, for example, 2 m height may be set to a rigid frame of 2.1 m length in order to reorient growth and provide a uniform light, thus growth rate and morphology, to the entire process. Several such established systems in parallel may fill such a frame. Such actions may also be employed to pre-adapt nursery material to an intended horizontal planting location including to temperature stress (bleaching).

In some embodiments, frame 501 and soft tensioned line system 503 concepts may be combined by setting the line through a pulley or runner at an end of the secured, elevated frame to a soft tensioning float or sinking mass. In some embodiments, a spring, elasticated line or similar may also be employed to provide tension.

Figure 6:
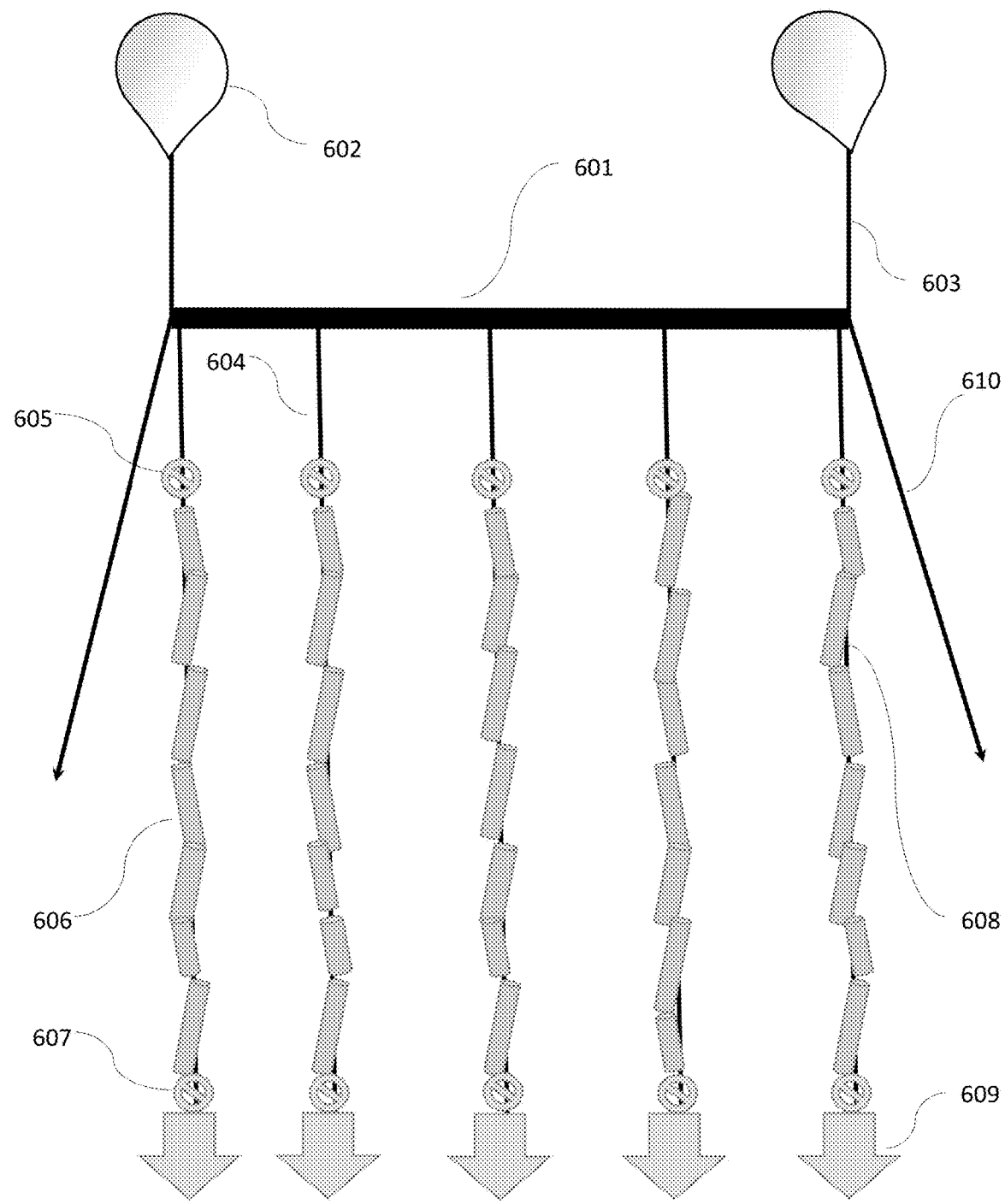
FIG. 6 is an illustration of an exemplary soft-tension or rigid rod system based on a weighted or negative buoyancy, according to an embodiment of the invention.

FIG. 6 illustrates a negative buoyancy option for soft-tension based on an elevated support bar 601 and tension provided by a plurality of sinking masses 609. As noted previously, FIG. 6 illustrates an inverted version of 301 (see FIG. 3) and multiplied into an array of parallel nursery lines. As such, this negative version may also be set as a single line system. Such a system may be suspended from floats, as per the illustration, or from a boat or dock. In some embodiments, a single line may also be used rather than the illustrated array.

In some embodiments, and with reference to frame 501 (see FIG. 5), support bar 601 may be supported by a plurality of elevating buoys 602, 603, etc. either to the surface or anchored mid-water or supported by legs 610 that may be anchored to the substratum, for example, as described in FIG. 5 502*a*.

In some embodiments, support bar element 601 may be provided by a boat, barge or dock or similar structure or a vertical line set taught between such structures.

In some embodiments, a rigid spacer bar may be set towards the bottom to keep the lines spaced. This spacer may be negatively buoyant and provide the tensioning mass 609 wherein the nursery lines 608 are of substantially equal length.

Operation

In a preferred embodiment, when setting target organism propagules to a nursery line, propagules of like genetic clone or other fusion or chimera development capability are attached lengthwise along the length of a single taught line or rod, as described in FIG. 1 or 2. For example, fragment attachment may be achieved in several ways including: i) within line, as per FIG. 1: a softly tensioned line 101 (positive mid-water buoy, negative buoyancy weight, elastic or spring) may be pinched and twisted through 180 to 270 degrees into a simple loop 102. Propagule 103 may then be inserted into loop 102 at its end 104 and loop 102 released. The tension may then accept any slack and the fragment may then be retained. This may be repeated at the opposite end of the fragment to set it in line with the line 105. According to experimentation, underwater time was 15-20 seconds per fragment. ii) along line or rod, as per FIG. 2: a pre-tensioned line or rod 201 may be set and target-organism fragments 202 attached by tying to it 203, 204 using another connector such as, but not limited to, a segment of line, wire, a cable-tie or adhesive 205. According to experimentation, underwater time was 20-60 seconds per fragment.

Such propagules are set to the tensioned line 306, 504, 606 at close end-to-end proximity 305, 503, 608 including overlap and touching 307. The system may then be then left under tension and the fragments allowed to heal and grow 302, 402 based on, for example, the timeline of which is related to species, conditions, and the specific growth patterns of the individual organism.

In initial days to weeks, the fragments overgrow the line/rod including loops and ties therein, securing the fastening loops or ties 313. Over subsequent weeks to months the fragments continue to grow to and long the line, engulfing the line in tissue. As neighboring fragments contact one another along the line they fuse, forming a single long organism along the length of the line or system segment 302.

Without exposed line to which fouling organisms may colonize 302, 402, the need for cleaning-maintenance is essentially eliminated in the established and growing system. An established system may then be left alone in a "set and forget" capacity for occasional branch harvest for further propagation experimentation or out-planting 403 as needed. It may also be forgotten entirely under a self-planting program wherein it outlives or outweighs its support system through a planned failure, usually of the mid-water float 303. Elimination of formal from-nursery out-planting suggests a cost savings of more than 30% within an overall program.

Exemplary Embodiments

In some embodiments, a system may develop rigid corals for use in various further nurseries and facilitated planting. According to the embodiment, long and large linear colonies may be produced on a taught line that may be reset intact or in portions into other nurseries for further growth, or set atop natural or artificial planting structures including permanent elevating structures or plinths including of steel, concrete, ceramic or glass.

In some embodiments, swivels, spinners and clips may be added. For example, swivels within the taught line 304, 308, 605, 607 may allow the samples to move and/or spin independently from a tensioning float or weight, facilitating fusion. Spinners also may reduce abrasion of the line at the line-sample boundaries. According the embodiments, clips or clasps, including those with integrated spinners, may be used at the line ends to accelerate and simplify setup by removing the necessity of tying knots underwater, including system shaking and possible propagule loss from the act of knot-tying.

In some embodiments, in vertical tensioned systems (for example, as illustrated in FIGS. 3 and 6), structural elements in closer proximity to the primary anchoring structure including anchor or bar attachment lines 310, 604, lines, clips and spinners 308, 605 may be of greater tensile strength than those at a tensioner-end of the system, adjacent to buoy 303 or mass 609. This is to ensure that any failure will occur at the distal end, thus the system will remain in place and not float away or sink unintendedly.

In some embodiments, a predator dam 309 may comprise a flat disc or conical device set within the line that interferes with or halts along-line access by crawling corallivors (coral and polyp-eating) including starfish, snails and worms.

In some embodiments, disease arrestors as breaks in the continuous tissue may comprise a rigid insert of, for example, brass, bronze, zinc, tin or otherwise antifouling treated material may be set into a line to generate a break in the continuous tissue serving to halt any advancing disease. In another embodiment, a brass, bronze or otherwise antifouling treated swivel or spinner may be set into the line to halt disease while providing rotational flexibility to the system without losing particular linear form including rigidity. In another embodiment, line-attachment points/loops of the break insert (solid or swivel) may be coated such that the target organism may overgrow these attachment points to incorporate all non-antifouling elements of the total system into the rigid final form. In another embodiment, different genetic lineages or species may be set at the ends of such a break for a diversified total system.

In some embodiments, a plurality of flex-points, for example, joint inserts of brass, bronze, zinc, tin or otherwise antifouling treatment may be set into the line to provide formal and known points of flexion to the system to allow greater system height under stormy conditions or facilitate some element of long-term use including but not limited to the facilitation of planting or float-failure self-planting. In another embodiment, with regard to disease arrestor breaks, the ends of such joints are coated or untreated such that target organism tissue will overgrow all but the specific point of flexion to form an otherwise comprehensively tissue-covered and rigid total form. In some embodiments, different genetic lineages or species may be set at the ends of such a joint for a diversified total system.

In some embodiments, a plurality of shock-absorbers, for example, rubber, spring, drop-weight, hydrodynamic or other shock-absorbent inserts may be set into the line at the anchoring portion of the system to minimize shock-stresses with storms that may lead to fracturing of the target organism or unplanned failure of the system.

In some embodiments, a plurality of buoy types related to zero-maintenance and self-planting, for example, teardrop-shaped or otherwise streamlined support buoys that may reduce wave energy transfer and related shock to the overall system, particularly during storms, may be added. In another embodiment, glass, steel, concrete or otherwise heavy yet degrading buoys allow for engineered failure for self-planting while reducing polluting plastics in the ocean.

In some embodiments, a degrading cap/cork of steel, cork, concrete or otherwise water, light or biodegrading material for a (glass) support float may provide comprehensive engineered failure in self-planting.

In some embodiments, lines may comprise non-stretching braided or fluorocarbon filament. In some embodiments, lines may comprise a primary line of 100 lb breaking strength braided line such as braided fishing line and/or include clips and swivels at tensioner region of similar or up to 50% lesser strength rating. In some embodiments, lines may comprise a substrate attachment line segment of 200 lb breaking strength of braided fishing line, carbon fiber line or fluorocarbon monofilament and may further comprise clips and swivels at the substratum/anchor of similar strength rating.

In some embodiments, rigid frames, exposed elements of line, swivels, clips, turnbuckles, floats and masses may be provided chemical antifouling treatments (for example, antifouling paints) as necessary. However, in a preferred embodiment of the invention, there is no need for such treatments.

Reference numerals used in the figures are as follows:

| Figure Label | Figure Item Name/Description |
|---|---|
| FIG. 1 | Fragment to line attachment under light or adjustable tension |
| 101 | soft tensioned line |
| 102 | loop drawn into soft tension to beyond 180 degrees |
| 103 | living propagule, a segment of living tissue of the nursery-target organism |
| 104 | inserting living propagule through loop 102 against the tension of line 101 |
| 105 | release of loops-tensions of 104 such that line firmly holds propagule. Repeated 102-104 for such loops at multiple points along line-propagule length |
| FIG. 2 | Fragment to line attachment under set tension using secondary ties/attachments, thus allowing use of a pre-tensioned line or rigid rod. |
| 201 | tightly tensioned line/rod |
| 202 | living propagule laid along tensioned line/rod |
| 203 | secondary attachment: knotted line, twisted wire, cable-tie, adhesive etc. |
| 204 | 203 repeated at least one time to secure propagule along line/rod |
| 205 | propagule securely attached to tightly tensioned line/rod by ties. |
| FIG. 3 | Soft tension or rod system examples at setup and at establishment |
| 301 | Vertical buoyant tensioned nursery at deployment with propagules secured. |
| 302 | Vertical buoyant nursery at establishment with propagules fused, including fused to support line. |
| 303 | Mid-water float for buoyant tension. |
| 304 | Clip-swivel of less-than 100 Lb tension strength (optional) |
| 305 | Tensioned line of 100 Lb tension strength. |
| 306 | Propagule within the system set as per FIG. 1 or FIG. 2 |
| 307 | Propagules immediately adjacent, overlapping or double-tied into the system |
| 308 | Swivel of more-than 100 Lb tension strength (optional) |
| 309 | Predator dam (optional) |
| 310 | Substrate attachment line of more-than 100 Lb tension strength |
| 311 | Anchor and/or substrate attachment |
| 312 | New growth from established organism |
| 313 | Fused and rigid single organism engulfing primary tensioned line/rod |
| FIG. 4 | Soft tension example at maturity |
| 401 | Mature nursery organism of abundant new growth |
| 402 | Strongly rigid single organism engulfing the primary tensioned line |
| 403 | Abundant new growth on the mature system, ready for next-step activities including new nursery set, experimentation and out-planting. |
| FIG. 5 | Tight tensioned or rod system example as set into rigid frame |
| 501 | Rigid frame (galvanized steel pipe, welded or tied rebar etc.) |
| 502a | Rigid support option, leg. May include securing of leg or lateral stays. |
| 502b | Buoyant frame support option, float and/or floating. May be used in conjunction with substrate anchor (not illustrated) |
| 503 | Taught line/rod secured taught at the rigid frame by knot, clip, threaded hook, bolt-nut, turnbuckle etc. |
| 504 | living propagule secured as per FIG. 2. |
| FIG. 6 | Soft tension or rod system based on a weighted negative buoyancy |
| 601 | Rigid support or tensioned line as primary support framework |
| 602 | Buoyant or floating supports. May also be extended legs from substrate |
| 603 | Buoyant support lines. |
| 604 | Substrate attachment lines of equal to or more-than 100 Lb tension strength |
| 605 | Swivel and/or clip of equal to or more-than 100 Lb tension strength |
| 606 | Live propagule set into system as per FIG. 1 or FIG. 2 |
| 607 | Swivel and/or clip of less than 100 Lb breaking strength |
| 608 | Tensioned line/rod of 100 Lb tension strength |
| 609 | Negative buoyancy tensioning mass |
| 610 | Anchors, legs and/or stays. |

Benefits to the Above Described Tensioned-Line Systems Over Current State of the Art:

A preferred embodiment provides a system that is highly simplified with minimal parts while being able to be rapidly deployed underwater with no knots to tie in setting propagule fragments. In some embodiments, no removal of fragments from the sea is required, thereby minimizing stress. In a preferred embodiment, high survivorship of set-coral material can be seen to, for example, greater than 95%, for example, to 6 months. A preferred embodiment may provide low to no maintenance soon after deployment, for example, after 6 weeks thereby creating a system for "set and forget" through self-planting endpoints available for restoration-scales. In some embodiments, a vertical arrangement provides full leverage advantage to the support buoy throughout the growth and harvest cycles. Some embodiments provide a rapid-disposal/planting optional stage for weight-limited coral nursery systems such as the midwater buoyant horizontal line. In some embodiments, productivity/efficiency of current line nurseries are expanded by postponing out-planting and reducing/eliminating costs of out-planting. In some embodiments, the system may be segmented in out-planting. In some embodiments, material is available for ongoing partial harvest into relative perpetuity. In some embodiments, single-clone supercolony may be produced for experimentation and facilitated spawning culture. In some embodiments, a supercolony of youthful elements (polyps) may be realized to maximize spawning potential and productivity. In some embodiments, in a single vertical line arrangement, vertically linear supercoral centralizes spawning material for simplified gamete capture in facilitated spawning culture. In a preferred embodiment, the system may be easily relocated for bleaching/hardening, storm, experimentation, etc. In some embodiments, a single anchor arrangement allows flexibility, for example, for hurricane durability. In some embodiments, a single vertical colony is self-shading and through multiple water strata for reduced bleaching mortality. In some embodiments, in a single line arrangement, a low likelihood of megafauna entanglement may be realized (for example, Florida/USA appropriate). In some embodiments, in a single line arrangement, there may be a reduced likelihood of fisher and anchor entanglement, or both. In some embodiments, in a single line arrangement, there may be a reduced likelihood of flotsam entanglement including during storms. In some embodiments, in a single linear coral arrangement, a main trunk may not be an attackable unit for *Hermodice* spp. predatory worms.

The skilled person will be aware of a range of possible modifications of the various embodiments described above.

What is claimed is:

1. A method for promoting propagule overgrowth for fouling organism hinderance comprising the steps of:
    deploying a propagule support line comprising a plurality of encircling loops for receiving and securing one or more living nursery propagules;
    attaching a buoy, to a first end of the propagule support line, to provide buoyancy;
    attaching a negatively buoyant anchoring arrangement, to a second end of the propagule support line, to provide a mass for providing, in combination with the buoy, a constant tension on the propagule support line;
    receiving and encircling a first living nursery propagule, of the one or more living nursery propagules, by a first encircling loop, of the plurality of encircling loops, the first living nursery propagule secured within first encircling loop by the tensioning of the support line;
    wherein the propagule support line is operable to be engulfed by an overgrowth of target organisms' tissues to provide an antifoulant treatment.

2. The method of claim 1, wherein the buoy is a mid-water buoy.

3. The method of claim 1, further comprising the steps of: placing at least one swivel at a mid-portion of the propagule support line allowing rotation of the propagule support line.

4. The method of claim 1, wherein the propagule support line is a rod.

* * * * *